United States Patent

[19]

Liebert

[11] 4,174,612
[45] Nov. 20, 1979

[54] PRESSURE AGENT CONTROL ARRANGEMENTS, ESPECIALLY FOR HYDRAULIC STEERING ARRANGEMENTS FOR MOTOR VEHICLES

[75] Inventor: Karl-Heinz Liebert, Schwabisch Gmund, Fed. Rep. of Germany

[73] Assignee: Zahnradfabrik Friedrichshafen AG, Friedrichshafen, Fed. Rep. of Germany

[21] Appl. No.: 889,852

[22] Filed: Mar. 24, 1978

[30] Foreign Application Priority Data

Mar. 24, 1977 [DE] Fed. Rep. of Germany ....... 2712920

[51] Int. Cl.$^2$ ............................................. F16D 31/00
[52] U.S. Cl. ...................................... 60/384; 60/402; 91/467; 137/596.13
[58] Field of Search ................... 60/384, 402; 91/391, 91/467; 137/596; 596.13

[56] References Cited

U.S. PATENT DOCUMENTS

| Re. 25,126 | 2/1962 | Charlson | 91/467 |
|---|---|---|---|
| 2,984,215 | 5/1961 | Charlson | 91/467 |
| 3,385,057 | 5/1968 | Pruvot et al. | 60/384 |
| 3,528,521 | 9/1970 | Ellis | 91/467 |

*Primary Examiner*—Edgar W. Geoghegan
*Attorney, Agent, or Firm*—Zalkind & Shuster

[57] ABSTRACT

The invention provides a pressure flow control valve for a booster steering system which effects an extended traverse of movement of concentric coacting valve sleeves relative to each other by a combined axial and rotary movement of the inner sleeve in order to smooth out the flow under control in pressurizing a servomotor, thus achieving an improved, or flatter, regulation curve characteristic, wherein a safe road reaction resistance to steering is effected, and wherein undesirable pressure fluctuations in the system are minimized as compared with prior art valving to reduce compressional vibration in the hydraulic system.

5 Claims, 7 Drawing Figures

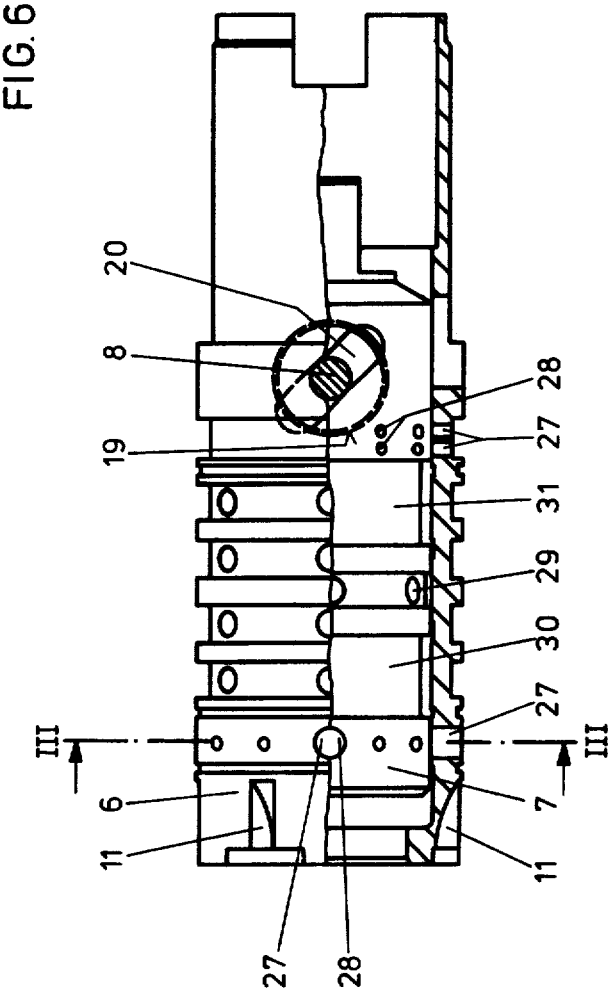

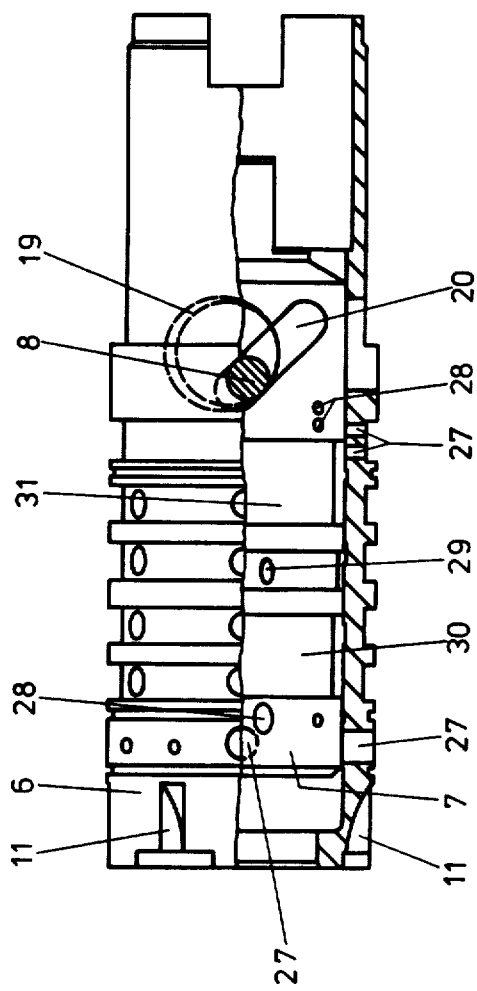

PRESSURE AGENT CONTROL ARRANGEMENTS, ESPECIALLY FOR HYDRAULIC STEERING ARRANGEMENTS FOR MOTOR VEHICLES

The invention effects an improvement over prior art arrangements such as shown in German Patent Nos. 1,293,029 (1969) and 1,550,559 (1969) U.S. Pat. Nos. to Charlson 2,984,215 (Re.25,126 and Pruvot et al, 3,385,057, respectively.

The arrangement described in the German Patent No. 1,293,029 has an inner valve sleeve with two conically shaped bores into which protrudes a driver pin, the perforations being conical and enlarged toward the outer ends. Based on the clearance between the bores and the driver pin, there is provision for relative movement between the inner valve sleeve and an outer valve sleeve, solely for rotation without axial shifting, since both valve sleeves are secured against axial shifting. Since this rotational relative movement for use in power steering of motor vehicles must be limited in order that a safe feeling of steering not be lost, opening and closing of radial flow bores for pressure feed control in the two valve sleeves via the rotational traverse is thus limited. The total rotational traverse, the sum of the traverses for the neutral, centered, position into the right and left hand terminal positions, determines the size of the flow control bores which must be somewhat smaller than half the rotational traverse. In rotational traverses which, for safety in steering, are only short, small bores must be used so that the control of pressure feed takes place from a full opening to a full closing according to a relatively steep regulation curve, related to the rotation. Such regulation of a hydraulic system with a steep characteristic curve is likely to effect undesirable pressure fluctuations in the hydraulic system.

In the German Pat. No. 1,550,557, there are likewise inner and outer valve sleeves using annular grooves for flow control which are aligned instead of bores that are to be aligned. The axial shifting of the two valve sleeves toward each other needed for this purpose is effected by an engagement of two balls in cam grooves running in the manner of a thread, whereby the balls are held by the outer valve sleeve and the cam grooves are disposed in the inner valve sleeve. This produces a problem in that the double guidance as a result of the two balls and of the two cam grooves requires an extreme precision in production, since the two valve sleeves are concentric practically without clearance and are carried correspondingly tightly in a housing, so that in case of the slightest deviation of the pitch from one cam groove to another, a jamming of this mechanism occurs immediately. Additionally, the same problem exists in regard to the steepness of the regulating curve as in the case of German Patent No. 1,293,029 since, for reasons of friction, the pitch of the cam grooves in practice cannot be greater than 45°. Essentially, the axial adjusting shift, i.e., relative traverse, is no greater than that effected by rotation in German Patent No. 1,293,029. Accordingly, German Patent No. 1,550,557 likewise has the disadvantage that the full opening and closing of the valves must take place over a relatively short shift traverse which leads to a correspondingly steep regulation curve and pressure fluctuation.

The present invention overcomes the disadvantages discussed by providing longer shift traverse, and thus a less steep characteristic curve of flow regulation.

This is accomplished by effecting both rotational and axial shift of the inner valve sleeve, effecting a resultant traverse having both rotational and axial components, using a cam slot in the inner sleeve sloping at about 45°. The overall effect increases the shift traverse by about a factor of 1.4 as compared with only axial or only rotational motion. This gain in length of the flow control shift traverse has a considerable effect in reducing steepness of the regulating curve which makes the control of steering less sensitive to the development of compressional vibrations due to pressure fluctuation. The enlargement of the shift traverse thus permits the radial flow bores in the valve sleeves to be correspondingly enlarged, effecting an increase of the flow cross section. Accordingly, loss in pressure in the control valve is decreased with corresponding reduction of the loss of output therethrough.

A novel feature of the invention resides in the use of a drive pin, such as pin 42 in German Patent No. 1,293,029, but in a totally different arrangement wherein one end of the pin protrudes into a cam slot in one side of the inner valve sleeve and the other end protrudes into a large conical bore in the opposite side. The cam slot and conical bore coact to effect and permit the two components of motion and to limit the traverses of each.

Compensation for the relative axial movement, as well as for a possible radial misalignment between the steering spindle which actuates the inner valve sleeve, is provided by a compensating disc which keys a drive connection therebetween as an intermediate driving element.

A detailed description now follows in conjunction with the appended drawing, in which:

FIG. 6 shows a generally exterior view of the two valve sleeves in neutral position;

FIG. 7 shows the two valve sleeves in a shifted, extreme position, as for rotation of the steering spindle of a motor vehicle for a left turn.

Figure 1:
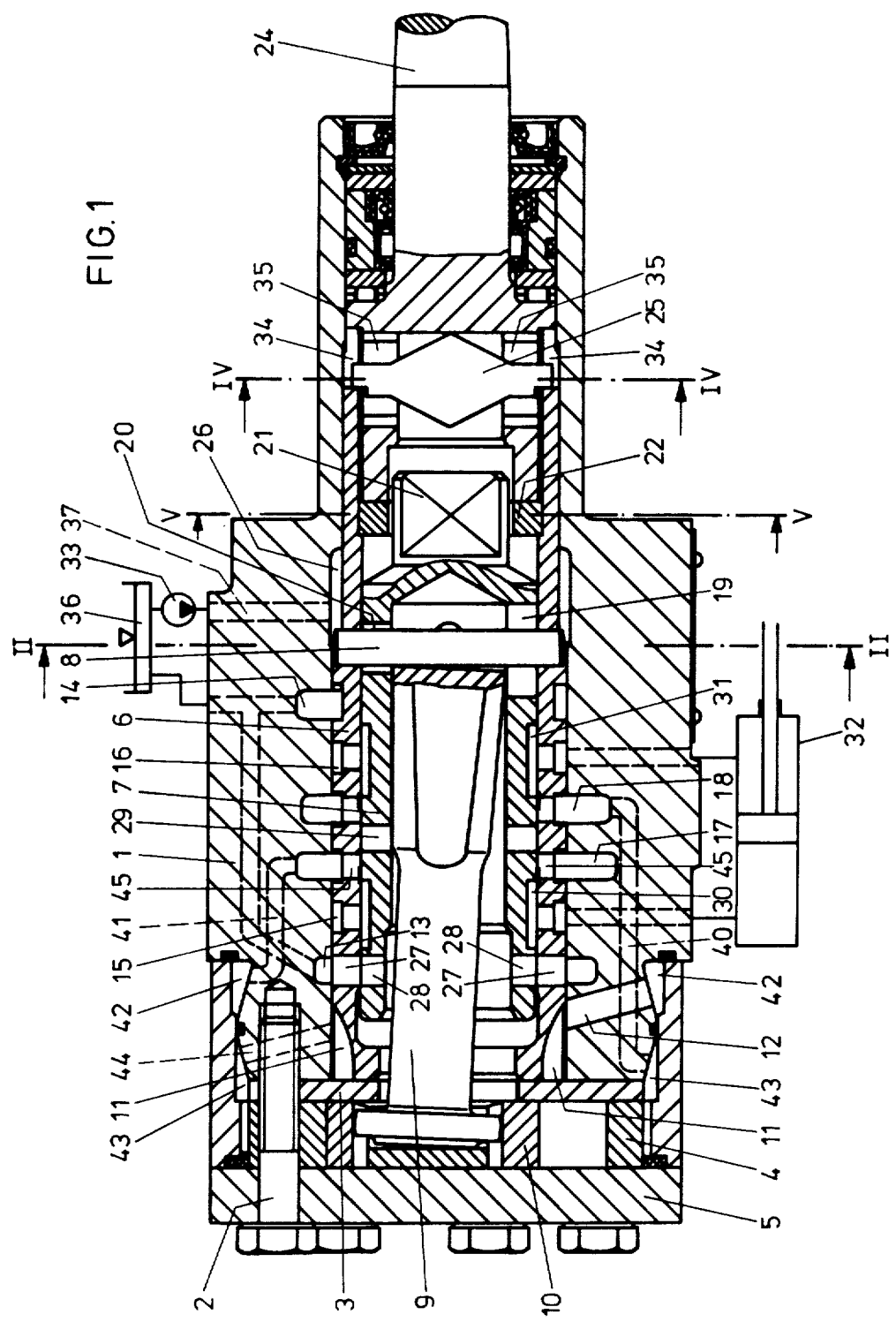
FIG. 1 shows a longitudinal section through the control valve in a neutral position.

Prior to detailed description, an overall explanation of operation will be helpful. Thus: Rotation of steering spindle 24 (FIG. 1) by a steering wheel (not shown) rotates an inner valve sleeve 7 and simultaneously effects axial movement. The outer valve sleeve 6 is rotary but has no axial movement, being held initially stationary by virtue of a drive connection therefrom to the inner gear of the usual metering pump. This provides initial reaction support against which a drive pin 8 carried by the outer valve sleeve remains stationary, having an end protruding into a fairly steep cam slot 20 of the inner sleeve valve, a coaction effecting axial shift of the sleeve valve along with the rotary movement. The resultant of these combined motions produces an increased distance or traverse of relative motion of the valve sleeves so that flow control ports 27, 28 can be made larger (FIGS. 6 and 7) to lessen abrupt change of flow cross section. Accordingly, a flatter characteristic curve of flow regulation is achieved with advantages of improved hydraulic system stability. After full resultant relative motion of the valve sleeves has been achieved to a limiting point determined simultaneously by cam slot 20 and a large conical bore 19, also in the inner sleeve, the entire assembly can be rotated to drive the metering pump through arched springs 25 (FIG. 4) via shaft 9 in the usual manner.

In the detailed description to follow, it will be understood that peripheral grooves, whether internal or external on the valve sleeves or in the housing, are continuously annular and of suitable width, where required, to provide flow where a continuous flow is indicated, regardless of relative positions of the valve sleeves. Also, the several flow control bores, as illustrated in FIGS. 1, 6 and 7, are provided in suitable plurality spaced around the peripheries of the valve sleeves.

It will also be understood that the outer valve sleeve 6 is a rotary distributor valve which directs flow from the metering pump, and has rotary movement only as will be clear from the physical construction shown in FIG. 1.

Referring to FIG. 1, a housing 1 is shown having end cover 5 attached to the housing 1 by means of screws 2, which cover holds an outer gear 4 of a conventional metering pump against closure plate 3, within gear 4 being the rotary gear 10 of the metering pump. The outer valve sleeve 6 is rotatably mounted in the housing 1 and has therein the inner valve sleeve 7. The outer sleeve is rotative but held against axial motion, while the inner sleeve has both rotary and axial motion. The outer valve sleeve 6 carries driver pin 8 in two aligned cross bores, as shown, and a yoke of the metering pump drive shaft 9 engages pin 8 to be rotated thereby in the usual manner, shaft 9 being connected in the usual manner to pump gear 10 via spherical, splined shaft teeth, as will be understood.

The outer valve sleeve 6 has longitudinal flow grooves 11 in its peripheral surface, which grooves communicate with channels 12 in the inner surface of housing 1. The connections to the inlets and outlets of the metering pump via passages are established in a known manner through the closure plate 3. Outer valve sleeve 6 forms a continuous connection to the housing return grooves 13 and 14, the valve sleeve having grooves 15 and 16 communicating with the respective chambers of the servomotor 32, as well as with housing groove 26, for the pressure feed of of the servopump 33 via housing bore 37.

Figure 5:
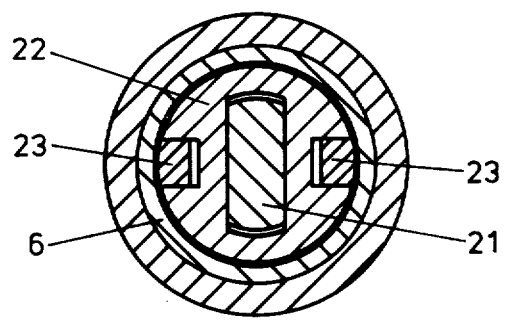
FIG. 5 shows a section on the line V—V of FIG. 1.

Inner valve sleeve 7, disposed concentrically in the logitudinal bore of the outer valve sleeve 6 and being axially and rotationally shiftable in relation to the former, is diametrically crossed by the driver pin 8, having an end protruding into a conical bore 19 provided in the wall of valve sleeve 7 and having its other end protruding into a slanting cam slot 20 in the wall but generally opposite the bore 19. The inner valve element has a tongue 21, keyed in a slot of an intermediate drive disc 22 (FIG. 5), for rotation thereby. The tongue can slide in the drive disc slot to permit axial shift of the drive disc which has side slots into which are keyed drive fingers 23 integral with the manually rotative steering spindle 24, operated by a vehicle driver via a steering wheel (not shown). The tolerances of the slots in disc 22 compensates for any misalignment of the axes of spindle 24 and of the inner valve sleeve, which may result from imprecise construction. Thus, disc 22 effects drive and misalignment compensation. A compensating disc has heretofore been known per se.

Figure 4:
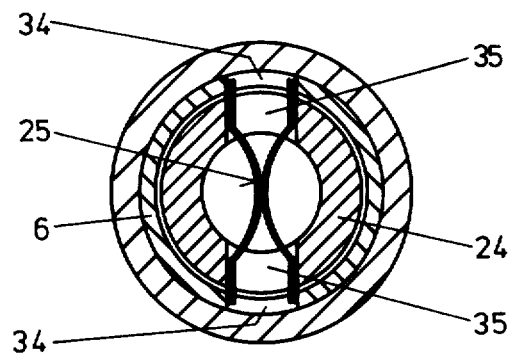
FIG. 4 shows a section on the line IV—IV of FIG. 1.

Referring to FIG. 4, slots 34 are provided in the valve sleeve 6 and slots 35 are provided in the spindle 24, bowed leaf springs 25, as shown, with pretension against the slot sides, being inserted therein, which hold the outer valve sleeve 6 and the inner valve sleeve 7 in a neutral position. The inner valve sleeve 7, as explained above, is keyed to and firmly rotatable with the drive shaft 24.

Upon rotation of the spindle 24, the inner valve sleeve 7 is rotated via fingers 23, the compensating drive disc 22 and the tongue 21. The outer valve sleeve 6 remains stationary while leaf springs 25 are then being flexed counter to returning force. Inner valve sleeve 7 is also shifted axially simultaneously via cam slot 20 acting on then stationary pin 8 (FIGS. 6 and 7). Reaction support to hold outer valve sleeve 6 stationary at this time is provided by the metering pump until sufficient spring tension is effected to rotate the outer valve sleeve via springs 25, and thus the outer valve sleeve 6, which carries pin 8 rotationally in its own plane to rotate shaft 9 and actuate the metering pump.

Figure 2:
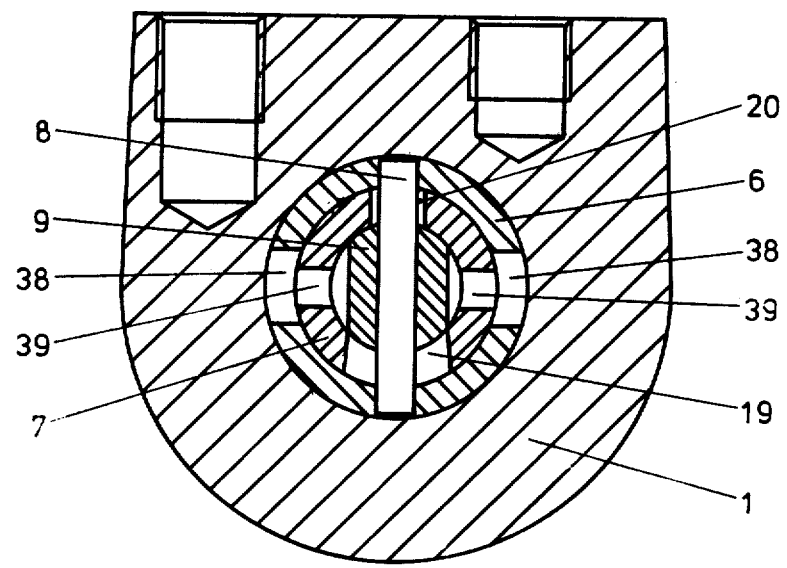
FIG. 2 shows a section on the line II—II of FIG. 1.

The hollow interior of inner valve sleeve 7 is in constant connection with the servopump 33 via housing bore 37, groove 26 in the housing, radial bores 38 (FIG. 2) in the outer valve sleeve 6, and the radial bore 39 in the inner valve sleeve 7. The size and position of radial bores 38 and 39 is such that, regardless of the axial and rotative shift of the valve sleeves relative to each other, these radial bores overlap, so that the interior of inner sleeve 7 is continuously supplied with hydraulic fluid.

In neutral position, the servomotor chambers are hydraulically blocked at grooves 30 and 31, but pressureless circulatory flow from the servopump to the expansion tank 36 takes place via bores 27 and 28, in the outer and inner valve sleeves, respectively, (FIG. 1).

Figure 3:
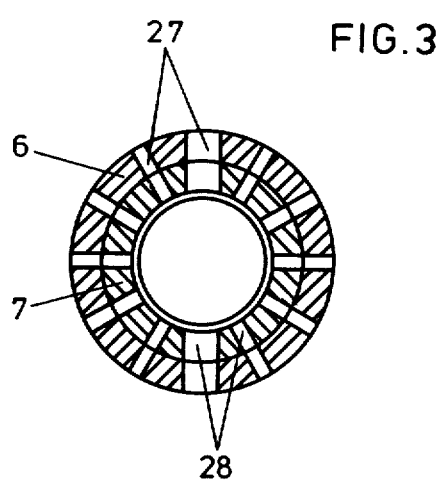
FIG. 3 shows a section on the line III—III of FIG. 6.

Upon relative rotation and simultaneous axial shifting of the inner valve sleeve 7 relative to the outer valve sleeve 6, the radial bores 27 and 28 (FIG. 3) effect progressively increasing closure and effect initially a reduction of the cross section of the shunt path for pressure fluid regulation of the operating pressure in the hydraulic system; and upon reaching full traverse, shunt flow of the neutral condition is cut off entirely.

With the above described shifting of the inner valve sleeve 7 relative to the outer valve sleeve 6, the pressure of the servopump 33 in the interior inside space of the inner valve sleeve 7 communicates with the housing grooves 17 or 18, depending on direction of rotation of spindle 24, via radial bores 29 of the inner valve sleeve 7. In conjunction with, for example, groove 18, the housing passage 40 will receive pressure medium that reaches an annular channel 43, effected between the closure plate 3 and the housing, from which channel the pressure medium flows via housing bore 44 to the longitudinal grooves 11 and thence in a known manner through passages in closure plate 3 to the metering gear pump for metering. From the metering pump, the pressure medium flows via closure plate 3 in a known manner into the housing bore 12 via the longitudinal grooves 11, from whence it flows via the annular channel 42 into the housing passage 41, from which the pressure medium reaches the radial bores 45 via the annular housing groove 17, from which bores 45 the pressure medium flows via groove 30 of the inner valve sleeve 7 to one chamber of the servomotor 32. The positions of the valve sleeves at this time are shown in FIG. 7. From FIG. 1 it is clear that the groove 31 communicates with the other chamber of the servomotor 32 independently of the position of the outer valve sleeve 6, so that the pressure medium can exhaust via groove 31 and via the radial bores 27 (FIG. 7), and via channels understood to be suitably provided in the housing (not shown) to the expansion tank 36. In the case of a reverse operation of the inside valve sleeve 7 for a right hand turn, correspondingly reverse processes take place.

In the FIGS. 6 and 7, the positions of the outer and inner valve sleeves are shown for purposes of comparison; in FIG. 6, the neutral position and in FIG. 7 in one of the two possible extreme positions. As seen in FIG. 6, the drive pin 8 is centered in the length of cam slot 20 of the inner valve sleeve 7. Two circles drawn in broken lines concentrically around the drive pin 8 represent the conical bore 19 of the inner valve sleeve 7 opposite the cam slot. When the inner valve sleeve 7 is turned counterclockwise (FIG. 2), while the outer valve sleeve 6 is held stationary firmly, drive pin 8 assumes the position shown in FIG. 7, the terminal position effected by the inner valve sleeve 7 having shifted axially to the right. At this time, drive pin 8 projecting into the perforation 19 rides on the surface of the bore 19 and one end simultaneously engages at its other end in an axial direction against an edge of cam slot 20 at some point on its surface, either upper or lower edge, depending on the direction of axial shift. Thus, a limited position of relative motion between the valve sleeves is established, although continued rotation of spindle 24 will continue the operation of the metering pump. For the purpose of achieving flow control, the registering bores 27 and 28 in FIG. 6 are misaligned in FIG. 7. The traverse of these bores is greater as a result of the combined rotative and axial motion than would be the case if they were only subjected to a purely axial or purely rotational shifting. The increase of relative traverse, as compared to purely axial or purely rotational shifting amounts to about 1.4, as hereinabove noted. Consequently, larger radial bores 27 and 28 are usable, which results in a cross section of flow which is less abruptly opened and closed than in the prior art. Accordingly, the invention achieves by way of an essentially enlarged traverse of flow control ports, i.e., radial bores such as radial bores 27 and 28, a valve effect with a limited rotational angle of the two valve sleeves 6 and 7 relative to each other. This limit of rotation for steering purposes is the maximum permissible non-response rotation of the steering spindle, but results in the desired flatter characteristic curve for pressure regulation.

The size of bore 19 is predetermined to effect the desired limiting of motion axially and rotatively of inner valve sleeve 7 in conjunction with the side faces of cam slot 20. The increase over prior art devices of relative shift by a factor of 1.4 is determined by the selection of a 45° pitch angle for the cam slot which is considered as the hypotenuse of an isosceles triangle, thus equal to the square root of 2, or 1.4 (approx). This angle requires only the degree of rotation of a steering wheel as in such prior art devices.

I claim:

1. In a booster steering system having a servopump, a metering pump, a servomotor, a tank, and a control valve, including connection means therebetween wherein said control valve has a housing having a pair of concentric valve sleeves therein shiftable relative to each other, there being passage means for said housing and for said valve sleeves for selective coaction responsive to the relative positions of said valve sleeves to selectively control flow between said servopump, said metering pump, said tank and said servomotor; one said valve sleeve 6) being connected for delayed rotation of said metering pump to manual rotating means, and the other said valve sleeve 7) being directly connected for rotation by manual rotating means; said passage means comprising passages (27) in said one valve sleeve coacting with passages (28) in the said other valve sleeve by being shiftable into and out of register for controlling flow through said control valve, effecting circulation of pressureless hydraulic fluid from said servopump to said tank in a neutral position of said valve sleeves for straight ahead steering and blocking said flow in a steering control position for a turn, wherein said one valve sleeve is a metering pump flow control valve and initially held against rotation by said metering pump in neutral position of said one valve sleeve while the other said valve sleeve is initially movable; the improvement which comprises: means intermediate said valve sleeves constructed and arranged to effect initial rotation of said other valve sleeve with simultaneous axial shift relative said valve sleeves when said one valve is stationary to effect reaction support for forces acting on said other valve sleeve; whereby the resultant relative traverse between said valve sleeves is increased beyond that for purely axial or purely rotative shift for the same extent of actuation of said manual rotating means, and wherein said valve sleeve passages (27,28) are of a size commensurate with the resultant traverse of combined motions so as to reduce abruptness in change of flow area cross section between said coacting passages when said valve sleeves are shifted.

2. In a pressure flow control valve for the power cylinder of a power booster steering system, a housing and a pair of concentric valve sleeves (6,7) therein, having coacting passage means for selectively effecting communication between system components in neutral and shifted positions of said valve sleeves relative to each other;

shift actuating means for initially rotating one said valve sleeve and shifting it axially simultaneously to effect an elongated resultant shift traverse relative to said other valve sleeve; said passage means comprising in said valve sleeves coacting flow passages (27, 28) therethrough in register in neutral position to effect pressureless flow through said control valve and out of register for a shifted pressure flow position, wherein said flow passages are sized commensurately with said elongated traverse for overlapping during valve operation for substantially the length of said elongated traverse to reduce abrupt changing of flow cross section in the course of shifting from registering to non-registering position.

3. In a control valve as set forth in claim 2, said shift actuating means comprising a cam slot in said one valve and a drive pin carried diametrically across and other valve and having an end protruding into said cam slot;

a motion limiting means comprising a bore in said one valve sleeve diametrically opposite said cam slot and being enlarged to a degree commensurate with the extent of resultant relative shift of said valve sleeves, the other end of said drive pin extending thereinto.

4. In a control valve as set forth in claim 3, said bore being conical, the larger end being radially outward.

5. In a control valve as set forth in claim 3, including manually rotational driving means comprising a steering spindle and a compensating disc keyed thereto, a tongue carried by said one valve extending slidably and keyedly into said disc and said steering spindle having fingers keyed thereto, said tongue and fingers being keyed with tolerance to compensate for axial misalignment of said steering spindle and said one valve sleeve.

* * * * *